United States Patent
Choi et al.

(10) Patent No.: US 8,542,688 B2
(45) Date of Patent: Sep. 24, 2013

(54) DATA LINK LAYER PROTOCOL UNIT, MOBILE RADIO DEVICE AND METHOD FOR MAPPING DATA WHICH ARE TO BE TRANSMITTED USING A MOBILE RADIO DEVICE FROM AT LEAST ONE LOGICAL CHANNEL, AND CONTROL DATA WHICH ARE TO BE TRANSMITTED, ONTO AT LEAST ONE TRANSPORT CHANNEL

(75) Inventors: Hyung-Nam Choi, Hamburg (DE); Harald Kahlstatt, Salzgitter (DE)

(73) Assignee: Intel Mobile Communications GmbH, Neubiberg (DE)

( * ) Notice: Subject to any disclaimer, the term of this patent is extended or adjusted under 35 U.S.C. 154(b) by 794 days.

(21) Appl. No.: 11/346,582

(22) Filed: Feb. 1, 2006

(65) Prior Publication Data

US 2006/0209896 A1 Sep. 21, 2006

(30) Foreign Application Priority Data

Feb. 4, 2005 (DE) .......................... 10 2005 005 251

(51) Int. Cl.
*H04L 12/56* (2011.01)
(52) U.S. Cl.
USPC ...................................... 370/395.42; 370/469
(58) Field of Classification Search
USPC ................. 370/464, 465, 469, 310, 328, 329,
370/335, 351, 389, 395.1, 394.1, 315, 316,
370/319, 343, 344, 431, 437, 480, 481, 395.4,
370/395.42, 442, 443, 444; 455/403, 422.1,
455/450, 435.1, 435.2, 435.3; 714/699, 712;
719/314
See application file for complete search history.

(56) References Cited

U.S. PATENT DOCUMENTS

| | | | |
|---|---|---|---|
| 6,310,866 B1 * | 10/2001 | Kronestedt et al. | 370/330 |
| 6,477,670 B1 * | 11/2002 | Ahmadvand | 714/712 |
| 6,967,940 B2 * | 11/2005 | Marinier et al. | 370/335 |
| 7,010,317 B2 * | 3/2006 | Hwang et al. | 455/522 |
| 2002/0085531 A1 * | 7/2002 | Herrmann et al. | 370/338 |
| 2003/0131124 A1 * | 7/2003 | Yi et al. | 709/236 |
| 2004/0228313 A1 * | 11/2004 | Cheng et al. | 370/342 |
| 2004/0254974 A1 * | 12/2004 | Khamfallah | 709/200 |
| 2005/0047416 A1 * | 3/2005 | Heo et al. | 370/395.4 |
| 2005/0073985 A1 * | 4/2005 | Heo et al. | 370/342 |

(Continued)

FOREIGN PATENT DOCUMENTS

DE 103 45 220 A1 4/2005

OTHER PUBLICATIONS

3G TS 25.301 v3.3.0 (Dec. 1999); *Technical Specification*; 3rd Generation Partnership Project; Technical Specification Group Radio Access Network; Radio Interface Protocol Architecture (3G TS 25.301 version 3.3.0) (Release 1999).

(Continued)

*Primary Examiner* — Obaidul Huq
(74) *Attorney, Agent, or Firm* — Schiff Hardin LLP

(57) ABSTRACT

A data link layer protocol unit, in a mobile radio device, that maps useful data which are to be transmitted using the mobile radio device from at least one logical channel, and control data which are to be transmitted, onto at least one transport channel, wherein the data link layer protocol unit maps the control data onto the at least one transport channel based on at least one prioritization information item associated with the control data which are to be transmitted from a plurality of prioritization information items.

15 Claims, 8 Drawing Sheets

(56) References Cited

U.S. PATENT DOCUMENTS

| | | | |
|---|---|---|---|
| 2005/0105499 A1* | 5/2005 | Shinozaki et al. | 370/338 |
| 2005/0176430 A1* | 8/2005 | Lee et al. | 455/436 |
| 2006/0062171 A1* | 3/2006 | Baiamonte et al. | 370/328 |
| 2006/0067279 A1* | 3/2006 | Kim et al. | 370/335 |
| 2006/0146833 A1* | 7/2006 | Roberts et al. | 370/395.42 |
| 2007/0081513 A1* | 4/2007 | Torsner | 370/349 |
| 2007/0161394 A1* | 7/2007 | Kuroda et al. | 455/522 |
| 2007/0275728 A1* | 11/2007 | Lohr et al. | 455/450 |

OTHER PUBLICATIONS

3GPP TS 25.309 v6.1.0 (Dec. 2004); *Technical Specification*; 3rd Generation Partnership Project; Technical Specification Group Radio Access Network; FDD Enhanced Uplink; Overall description; Stage 2 (Release 6) (Dec. 2004).

TS 25.331 v3.0.0 (Oct. 1999); *Technical Specification*; 3rd Generation Partnership Project (3GPP); Technical Specification Group (TSG) RAN; Working Group 2 (WG2); RRC Protocol Specification (Release 1999).

3GPP TS 25.321 v6.3.0 (Dec. 2004); *Technical Specification*; 3rd Generation Partnership Project; Technical Specification Group Radio Access Network; Medium Access Control (MAC) protocol specification (Release 6).

3GPP TS 25.322 v6.2.0 (Dec. 2004); *Technical Specification*; 3rd Generation Partnership Project; Technical Specification Group Radio Access Network; Radio Link Control (RLC) protocol specification (Release 6) (Dec. 2004).

* cited by examiner

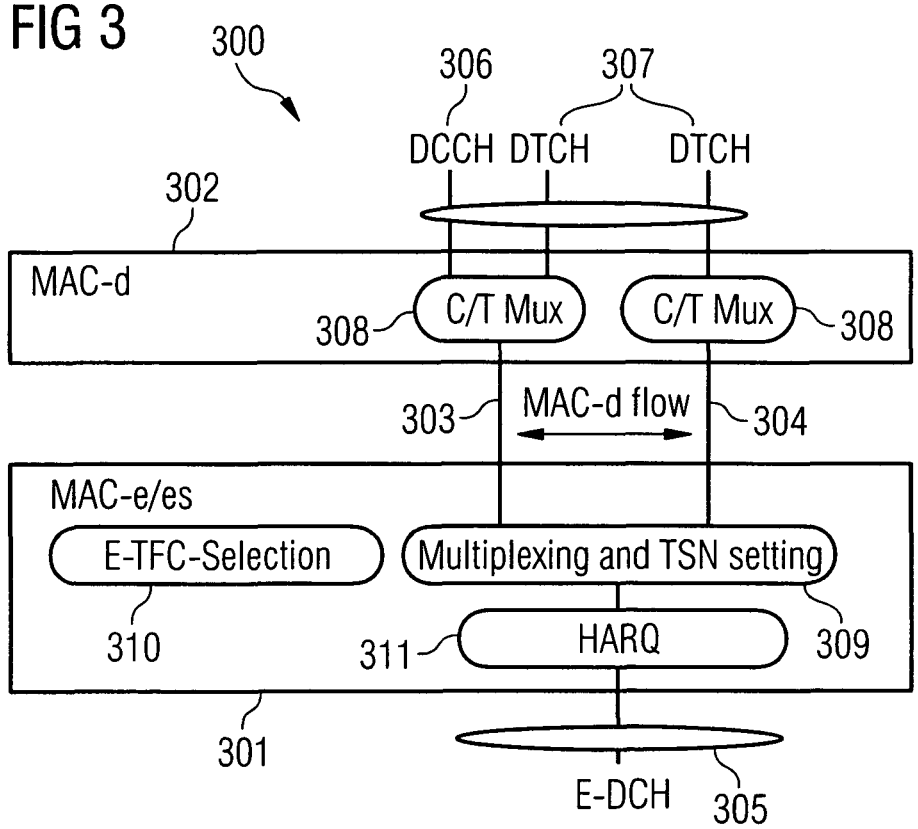
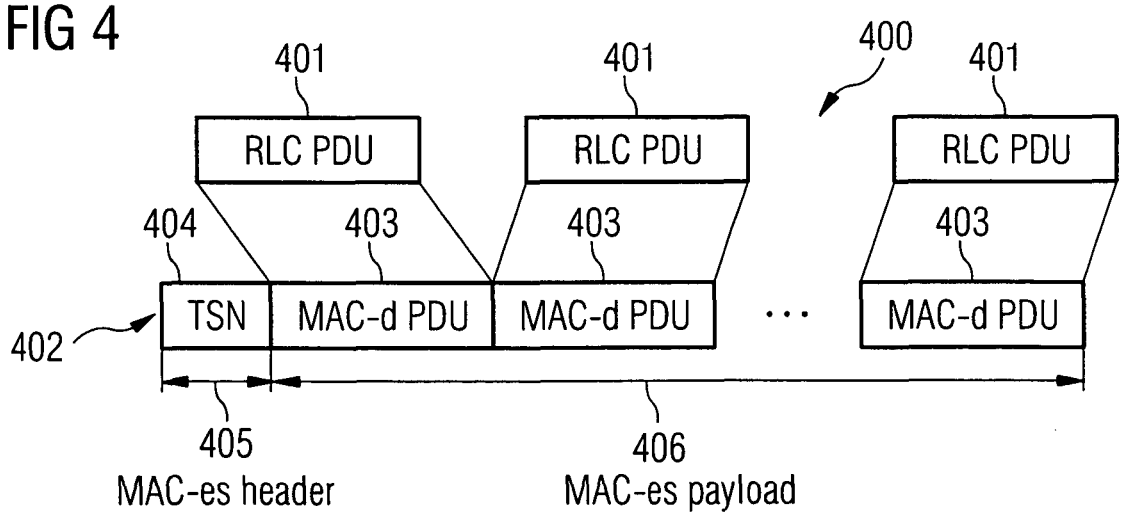

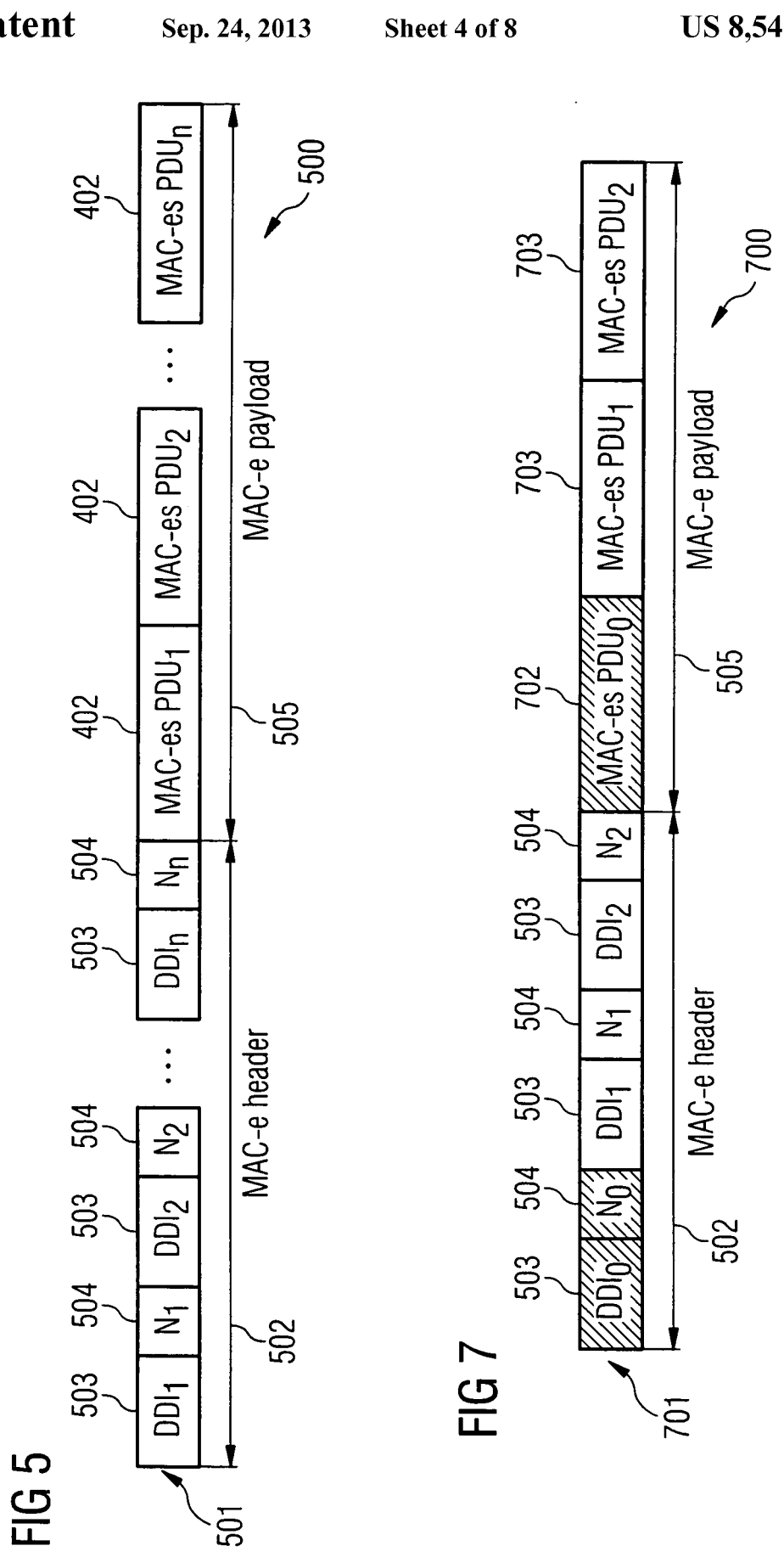

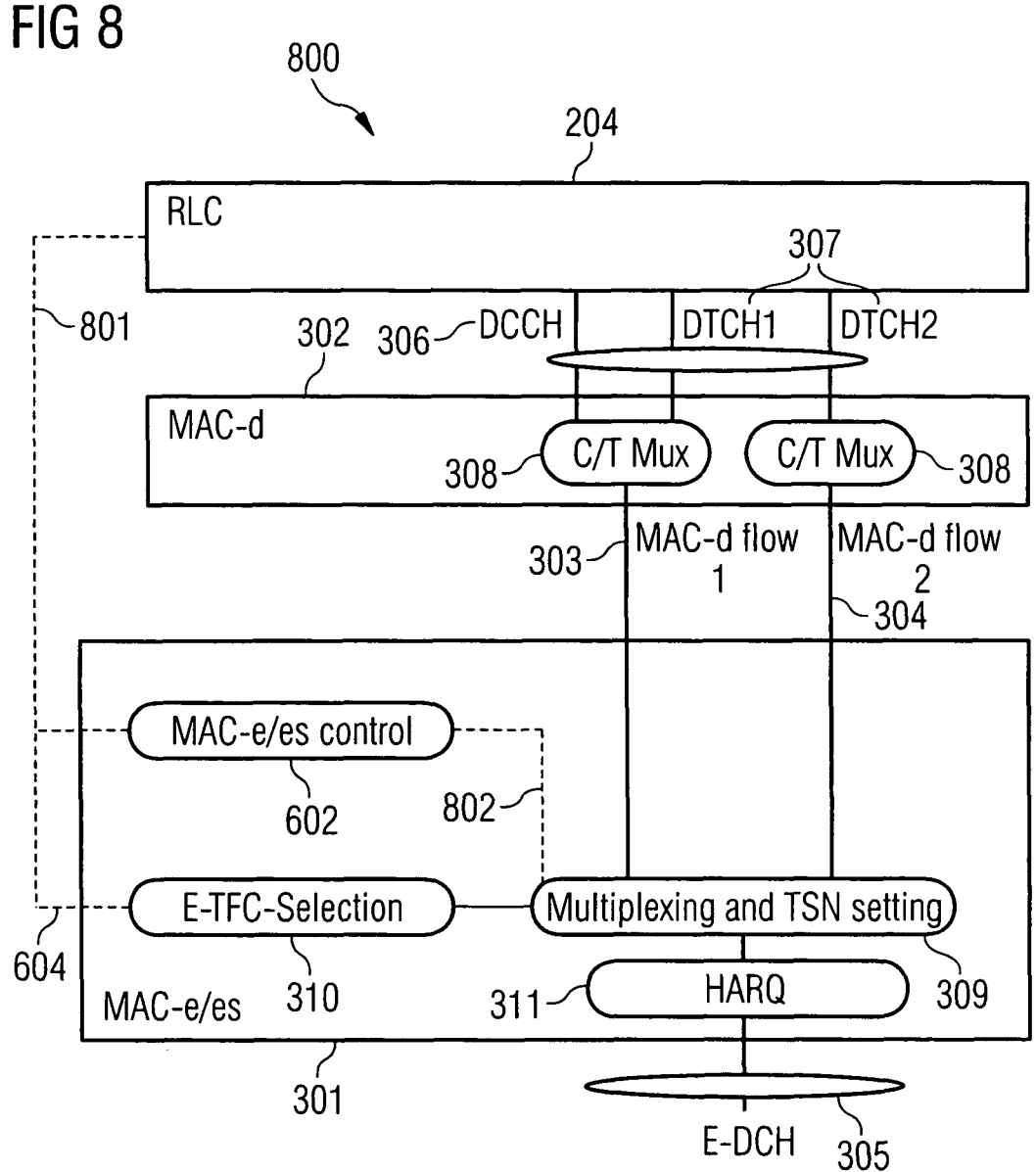

DATA LINK LAYER PROTOCOL UNIT, MOBILE RADIO DEVICE AND METHOD FOR MAPPING DATA WHICH ARE TO BE TRANSMITTED USING A MOBILE RADIO DEVICE FROM AT LEAST ONE LOGICAL CHANNEL, AND CONTROL DATA WHICH ARE TO BE TRANSMITTED, ONTO AT LEAST ONE TRANSPORT CHANNEL

CROSS-REFERENCE TO RELATED APPLICATION

This application claims priority to German Patent Application Serial No. 10 2005 005 251.7-31, which was filed on Feb. 4, 2005, and is incorporated herein by reference in its entirety.

FIELD OF THE INVENTION

The invention relates to a data link layer protocol unit, a mobile radio device and a method for mapping data which are to be transmitted using a mobile radio device from at least one logical channel, and control data which are to be transmitted, onto at least one transport channel.

BACKGROUND OF THE INVENTION

Such a mobile radio device, such a mobile radio network control unit and such a method are known within the context of the mobile radio system UMTS (Universal Mobile Telecommunications System).

A UMTS mobile radio system normally has a core network (CN), a mobile radio access network (UMTS Terrestrial Radio Access Network, UTRAN) and also a large number of mobile radio terminals (user equipment, UE). In UMTS, a transmission mode is provided, called FDD (Frequency Division Duplex) mode, which involves separate signal transmission taking place in the uplink direction (uplink direction—also denoted uplink—denotes a signal transmission direction from a mobile radio terminal to a respective base station in the mobile radio access network) and in the downlink direction (downlink direction—also denoted downlink—denotes a signal transmission direction from a respective base station associated with the mobile radio terminal in the mobile radio access network to the mobile radio terminal) through separate allocation of frequencies or frequency ranges.

For the purpose of transmitting data between a mobile radio terminal and a respective base station in a mobile radio cell, UMTS defines an air interface which is divided into three protocol layers. An overview and a detailed description of the air interface protocol layers based on UMTS can be found in 3GPP TS 25.301, Technical Specification, Third Generation Partnership Project; Technical Specification Group Radio Access Network; Radio Interface Protocol Architecture (Release 1999).

One of the three protocol layers of the UMTS air interface is known as the Radio Resource Control (RRC) protocol layer. The RRC protocol or the RRC protocol layer is responsible for setting up and clearing down and also for (re)configuring physical channels, transport channels, logical channels, signaling radio bearers and radio bearers, and also for negotiating all parameters of the protocol layers of layer 1 and layer 2 on the basis of UMTS. To this end, the units of the RRC layer in the mobile radio terminal and in the mobile radio network control unit use the signaling radio bearers to interchange appropriate RRC messages, as described in 3GPP TS 25.331, Technical Specification, Third Generation Partnership Project; Technical Specification Group Radio Access Network; RRC Protocol Specification (Release 1999).

For the purpose of management, generally the management of mobile radio transmission resources in the mobile radio terminal within the context of the uplink packet data transmission, it is known that the mobile radio terminal communicates information about the volume of data traffic in a transport channel to a mobile radio network control unit (Radio Network Controller, RNC) on the plane of the RRC protocol layer. This is done using "measurement report messages". In this connection, as table 1 below shows, data buffer store filling levels, i.e. the filling level of the data buffer stores in the RLC units, for the transport channel in question are indicated to the currently competent mobile radio network control unit. In other words, this means that in line with 3GPP TS 25.331, Technical Specification, Third Generation Partnership Project; Technical Specification Group Radio Access Network; RRC Protocol Specification (Release 1999) the mobile radio network control unit is sent notification on the RRC layer plane regarding how many data items to be transmitted there are at present in the buffer stores in the RLC units of the respective mobile radio terminal.

In this connection, mobile radio transmission resources are to be understood, in particular, to mean the transmission power of the mobile radio terminal, the number and also the spreading factor of the allocated CDMA codes.

Table 1 shows an example of such a measurement result list, as described in 3GPP TS 25.331, Technical Specification, Third Generation Partnership Project; Technical Specification Group Radio Access Network; RRC Protocol Specification (Release 1999):

TABLE 1

| Information Element/Group name | Need | Multi | Type and reference | Semantics description |
|---|---|---|---|---|
| Traffic volume measurement results | OP | 1 to <maxRB> | | |
| >RB Identity | MP | | RB Identity 10.3.4.1 6 | |
| >RLC Buffer Payload | OP | | Enumerated (0, 4, 8, 16, 32, 64, 128, 256, 512, 1024, 2K, 4K, 8K, 16K, 32K, 64K, 128K, 256K, 512K, 1024K) | In bytes And N Kbytes = N * 1024 bytes. Twelve spare values are needed. |
| >Average of RLC Buffer Payload | OP | | Enumerated (0, 4, 8, 16, 32, 64, 128, 256, 512, 1024, 2K, 4K, 8K, 16K, 32K, 64K, 128K, 256K, 512K, 1024K) | In bytes And N Kbytes = N * 1024 bytes. Twelve spare values are needed. |
| >Variance of RLC Buffer Payload | OP | | Enumerated (0, 4, 8, 16, 32, 64, 128, 256, 512, 1024, 2K, 4K, 8K, 16K) | In bytes And N Kbytes = N * 1024 bytes. Two spare values are needed. |

Using this information, the mobile radio network control unit can configure the mobile radio terminal as appropriate, for example in order to restrict or expand the usable transport formats of a mobile radio terminal or to perform handover to another mobile radio cell, reconfiguration of the dedicated physical channels or an RRC state change, particularly from a first RRC state CELL_DCH to a second RRC state CELL_FACH.

The measurement result list shown in Table 1 is thus transmitted from an RRC unit in the mobile radio terminal to the RRC unit in the corresponding mobile radio network control unit, and the respective RRC data buffer store filling level is indicated for each radio bearer (RB).

The standardization committee 3GPP (3rd Generation Partnership Project) is currently, as described in 3GPP TS 25.309 Technical Specification, Third Generation Partnership Project; Technical Specification Group Radio Access Network; FDD Enhanced Uplink; Overall description, stage 2, Release 6, December 2004, working on improving the packet data transmission via dedicated transport channels in the uplink, i.e. for the uplink direction at the UMTS air interface for the FDD mode, with a view to increasing the data throughput and the transmission speed. To achieve better differentiation from the already existing dedicated transport channel DCH, a new dedicated transport channel called enhanced dedicated channel (E-DCH) has been introduced for this purpose. The fundamental characteristics of this new transport channel include the application of a hybrid automatic repeat request method (HARQ method) based on the N-channel Stop&Wait method, scheduling controlled by the base station, also called NodeB in UMTS, and also frame lengths of less than or equal to 10 ms, particularly of 2 ms and 10 ms.

The N-channel Stop&Wait HARQ method is a transmission protection method in which a mobile radio terminal has a number of N "HARQ processes" configured for it, with an HARQ process representing a respective instance of the Stop&Wait method. For each HARQ process, the data are transmitted to the network and are buffer-stored until the network receives acknowledgement of correctly received data (Acknowledgement, ACK). Otherwise, i.e. if the data have not been received correctly (Negative Acknowledgement, NACK), the data are transmitted to the network again.

NodeB-controlled scheduling is a method in which the scheduling in the mobile radio terminal, i.e. the selection of an appropriate transport format from a set of defined transport formats for the E-DCH transport channel, is controlled such that NodeB can temporarily restrict or expand a mobile radio terminal's use of transport formats from the set of defined transport formats for the E-DCH transport channel on the basis of the traffic situation in the respective radio cell.

Both functions are executed within the MAC protocol layer in the newly provided subprotocol layer, i.e. a "medium access control e/es entity" (subprotocol layer) which is provided, i.e. implemented, both on the terminal and on the network.

By the terminal end, there is no functional separation of the new MAC-e/es subprotocol layer. By contrast, at the network end, functional separation is provided, i.e. the MAC-e entity, in other words the MAC-e unit, is at NodeB (i.e. the UMTS base station) and the MAC-es unit is in the RNC.

An important function of the MAC-e unit in the subscriber terminal, i.e. in the mobile radio terminal, is to perform the scheduling of the data for the uplink on the basis of a transport format selection method, i.e. to select a suitable transport format for the E-DCH transport channel at defined times on the basis of the currently permitted data transmission rate, the priority of the useful data which is to be transmitted and the available transmission power for the E-DCH transport channel.

Correspondingly, an important function of the MAC-e subprotocol layer at NodeB is to control the scheduling in the subscriber terminal. The scheduling needs to be controlled such that NodeB can temporarily restrict or extend the use of transport formats from the set of defined transport formats for the E-DCH transport channel on the basis of the respective traffic situation in the mobile radio cell for which NodeB is responsible and the quality of service (QoS) characteristic of the useful data which are to be transmitted.

So that NodeB can perform efficient scheduling for the subscriber terminals in a mobile radio cell, provision is made for the subscriber terminals to signal appropriate control information, i.e. for example their current data buffer filling levels and transmission power situation to NodeB on the plane of the MAC-e subprotocol layer. For transmitting the control information, there are basically two options, namely firstly as a separate, i.e. independent, control protocol data unit and secondly together with the useful data which are to be transmitted in a protocol data unit, i.e. clearly "piggybacked" in other words packed into a useful data protocol data unit.

On the basis of the conventional devices, transmission of the control information, particularly transmission of the control data of the MAC-e/es subprotocol layer, always has a higher priority in the data link layer over transmission of useful data.

DESCRIPTION OF THE DRAWINGS

Exemplary embodiments of the invention are illustrated in the figures.

FIG. 3 shows an illustration of the units in an MAC-e/es subprotocol layer on the part of a mobile radio terminal;

FIG. 4 shows an illustration of an MAC-es protocol data unit structure;

FIG. 5 shows an illustration of an MAC-e protocol data unit structure;

FIG. 7 shows an illustration of an MAC-e protocol data unit structure based on the exemplary embodiment of the invention shown in FIG. 6;

FIG. 8 shows an illustration of the units in an MAC-e/es subprotocol layer for a mobile radio terminal based on another exemplary embodiment of the invention;

DESCRIPTION OF THE INVENTION

Figure 1:
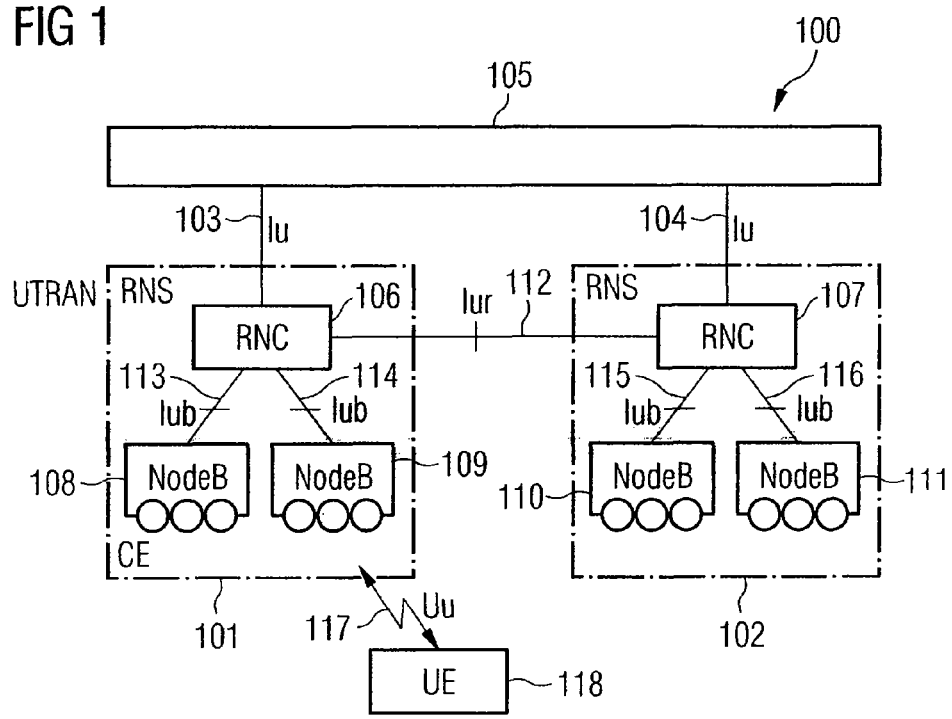
FIG. 1 shows a communication system based on an exemplary embodiment of the invention.

The invention allows the transmission capacity available in the data link layer to be used more efficiently on the transport channel.

Clearly, the control information to be transmitted on the protocol layer plane of the data link layer, preferably on the plane of the medium access control protocol layer, particularly preferably on the plane of the MAC-e/es subprotocol layer, is mapped onto the respective transport channel on the basis of the priority of the control information which is to be transmitted and the available transmission capacity.

This achieves significantly more efficient use of the transmission capacity on the respective transport channel, since the control information is now not transmitted with higher priority than the useful data transmitted in the data link layer every time regardless. In line with the invention, depending on the type of control information, the respective control information is allocated a priority and the control information is transmitted in the data link layer, i.e. in other words the control data are mapped onto the transport channel, on the basis of the priority which has been allocated to the respective control information. Hence, the control information is clearly mapped onto the transport channel and sent on the basis of its priority and the available transmission capacity.

This makes it possible to support an indication about the urgency or importance of the control information which is to be transmitted.

In addition, the respective urgency or importance of the control information is taken as a basis for ensuring rapid transmission thereof.

Finally, distribution of the transmission capacity between the control information and the useful data information is optimized, since it is now possible for the first time to transmit high-priority useful data information at an earlier time than and hence in preference over low-priority control information.

Preferred refinements of the invention can be found in the dependent claims.

In line with one refinement of the invention, provision is made for the data link layer protocol unit to have a plurality of data link layer protocol buffer stores for buffer-storing the useful data which are to be transmitted from one or more data link layer data streams of the data of the logical channel and for buffer-storing the control data which are to be transmitted. A likewise provided data link layer protocol buffer store association unit is set up such that, depending on the type of control data which are to be transmitted, it associates a prioritization information item respectively provided and prescribed for this type from a plurality of possible prioritization information items with the control data which are to be transmitted, and the prioritization information items preferably correspond to the priorities which are associated with the data link layer protocol buffer store within the context of the scheduling for reading the useful data. In addition, a data link layer protocol buffer store reading device is provided which is set up such that it reads the data buffer-stored in the data link layer protocol buffer stores on the basis of a prescribable criterion taking into account the prioritization of the data link layer protocol buffer stores.

In addition, the data link layer protocol unit can have
at least one transport format memory for storing a plurality of transport formats, where each transport format contains control parameters on the basis of which the data are mapped from the at least one logical channel onto the at least one transport channel by the data link layer protocol unit.

Also, a transport format selection unit for selecting a respective transport format which is to be used from the plurality of stored transport formats can be provided and also a data link layer protocol buffer store reading device which is set up such that it reads the data buffer-stored in the data link layer protocol buffer stores on the basis of the selected transport format.

In this connection, a data link layer has one or more of the following subprotocol layers, for example when the mobile radio device is set up to communicate on the basis of the UMTS communication standard:
radio link control layer (RLC),
packet data convergence protocol layer (PDCP),
broadcast/multicast control layer (BMC),
medium access control Layer (MAC).

In this connection, it should be noted that the data link layer protocol buffer stores of one or more subprotocol layers can be set up as a common memory with memory areas logically associated with the respective different memories or else as separate memories.

In particular, the method for controlling the reading of the buffer stores of the data link layer is suitable for use in a mobile radio terminal, with the inherently known transport formats and also the inventive supplementary information in the transport formats, that is to say the information in the buffer stores or data link layer data streams from which the data are read and are respectively mapped onto the logical channel, being stored, preferably being prescribed by the UTRAN, particularly preferably by a mobile radio network control unit and/or by the UMTS base station (NodeB).

In line with one refinement of the invention, the at least one data link layer protocol unit is in the form of one of the following units:
radio link control (RLC) unit,
packet data convergence protocol (PDCP) unit,
broadcast/multicast control (BMC) unit.

In line with another refinement of the invention, the data link layer protocol unit is in the form of a medium access control unit, with the medium access control unit being able to be set up as a unit in one of the following subprotocol layers of the medium access control layer:
medium access control d subprotocol layer (MAC dedicated layer),
medium access control c/sh subprotocol layer (MAC control/shared),
medium access control b subprotocol layer (MAC broadcast), and/or
medium access control e/es subprotocol layer (MAC enhanced uplink).

If the data link layer protocol unit is in the form of a medium access control unit then at least some of the data link layer protocol buffer stores are medium access control unit protocol buffer stores and the data link layer data streams are medium access control unit data streams. Some of the data link layer protocol buffer stores may additionally be implemented in another subprotocol layer of the data link layer (which subprotocol layer is preferably arranged above said data link layer protocol buffer stores from the point of view of communication engineering), for example in the radio link control unit, so that, by way of example, the useful data can be buffer-stored in this subprotocol layer too.

Particularly when the data link layer unit is set up as a medium access control e/es unit, it has a medium access subcontrol unit and also an automatic repeat request control unit. At least some of the plurality of data link layer protocol buffer stores are set up as medium access control buffer stores which are used to buffer-store the data. In other words, this means that the buffer stores are the buffer stores of the ARQ process in the MAC-e/es protocol unit.

The automatic repeat request control unit is preferably set up on the basis of MAC-e/es to carry out a hybrid automatic repeat request method (HARQ method).

In line with one refinement of the invention, the automatic repeat request control unit is set up to carry out precisely one automatic repeat request process per data link layer buffer store.

In line with another refinement of the invention, provision is made for the data link layer protocol unit to be set up to select a transport format for each automatic repeat request process.

In addition, the data link layer protocol buffer stores may be automatic repeat request buffer stores, with each automatic repeat request buffer store being associated with an, preferably precisely one, automatic repeat request process. In line with this refinement of the invention, the data link layer protocol unit is set up such that the transport format(s) is/are selected on the basis of filling levels in the automatic repeat request buffer stores.

In line with one refinement of the invention, a first medium access subprotocol data unit generation unit is provided for generating first medium access subprotocol data units and a second medium access subprotocol data unit generation unit is provided for generating second medium access subprotocol data units. In line with this refinement of the invention, the second medium access subprotocol data unit generation unit is set up such that it forms the second medium access subprotocol data unit using the first medium access subprotocol data unit.

Clearly, the first medium access subprotocol data unit generation unit, for example, forms an MAC-es subprotocol layer unit and the second medium access subprotocol data unit generation unit forms the MAC-e subprotocol layer unit.

The first medium access subprotocol data unit generation unit can be set up such that it forms control medium access subprotocol data units containing the control data which are to be transmitted or useful data medium access subprotocol data units containing the useful data which is to be transmitted. This clearly corresponds to generation of separate protocol data units for control data or for useful data in the MAC-e/es subprotocol layer. By way of example, this means that the MAC-es subprotocol layer unit forms independent protocol data units respectively for the control data in the MAC-e subprotocol layer and the useful data, i.e. for example the data streams in the MAC-d subprotocol layer, i.e. for example the MAC-d flows.

In line with another refinement of the invention, provision is made for the first medium access subprotocol data unit generation unit to be set up such that it forms useful data medium access subprotocol data units containing the useful data which are to be transmitted, with the control data medium access subprotocol data units being added to the useful data which is to be transmitted in the useful data medium access subprotocol data units.

This refinement of the invention clearly corresponds to a refinement in which, by way of example, the MAC-es subprotocol layer unit forms just one type of MAC-es protocol data units in which both the control data in the MAC-e protocol layer and the useful data, i.e. the data in the MAC-d flow(s), i.e. the data delivered by the protocol layer which is superordinate to the MAC-es subprotocol layer, are encoded to form a respective MAC-es protocol data unit which, for their part, are then assembled in the MAC-e subprotocol layer to form an MAC-e protocol data unit.

In line with another refinement of the invention, a medium access subprotocol control data buffer store is provided for buffer-storing the control data, particularly the control data of the medium access subprotocol unit.

In line with this refinement of the invention, provision may be made for the control data to be read according to the type of control data buffer-stored in the at least one buffer store and to be supplied to the MAC-es subprotocol layer, which encodes them together with the useful data in the MAC-d flows to form an MAC-es protocol data unit which is based on at least the same priority as corresponds to the priority of the respective control data.

In this case, a medium access subprotocol control data buffer store reading unit can be provided for reading the control data from the medium access subprotocol control data buffer store in line with the prioritization information items. The data link layer protocol unit is preferably set up as a medium access control unit in a medium access control unit enhanced uplink subprotocol layer.

The control data are preferably control data of the data link layer, particularly preferably control data of the medium access control protocol layer, particularly preferably of the medium access control enhanced uplink subprotocol layer (MAC-e/es layer).

The mobile radio device and the units of the mobile radio network are preferably set up on the basis of a communication standard for communication on the basis of a cellular mobile radio system, preferably for communication on the basis of the cellular mobile radio system UMTS.

The mobile radio device can have a transmission control device for controlling mobile radio transmission resources of the mobile radio device, with the transmission control device being set up to receive the transport formats from another mobile radio device, allowing the transport formats to be prescribed by the other mobile radio device.

One aspect of the invention can be seen in that explicit priorities for control information, particularly of the data layer, are defined on the basis of the type of information to be transmitted and the respective trigger mechanism, which results in the formation of the respective control information, i.e. the control data, for transmitting this information.

On the basis of its priority, the control information is buffer-stored in an MAC-e/es transmission buffer and is processed, generally in a transmission buffer of the respective data link layer. The control information is therefore transmitted on the basis of its priority and the available transmission capacity on the respective transport channel, particularly preferably on the E-DCH transport channel. This improves the distribution of the transmission capacity of the E-DCH transport channel.

FIG. 1 shows a UMTS mobile radio system 100, for reasons of simpler illustration particularly the components of the UMTS mobile radio access network (UMTS Terrestrial Radio Access Network, UTRAN), which has a plurality of mobile radio network subsystems (RNS) 101, 102 which are respectively connected by means of an "Iu" interface 103, 104 to the UMTS core network (CN) 105. A mobile radio network subsystem 101, 102 has a respective mobile radio network control unit (Radio Network Controller, RNC) 106, 107 and also one or more UMTS base stations 108, 109, 110, 111, which are also called NodeB in UMTS.

Within the mobile radio access network, the mobile radio network control units 106, 107 of the individual mobile radio network subsystems 101, 102 are connected to one another by means of an "Iur" interface 112. Each mobile radio network control unit 106, 107 respectively monitors the assignment of mobile radio resources for all the mobile radio cells in a mobile radio network subsystem 101, 102.

A UMTS base station 108, 109, 110, 111 is respectively connected to a mobile radio network control unit 106, 107 associated with the base station by means of an "Iub" interface 113, 114, 115, 116.

Each UMTS base station 108, 109, 110, 111 clearly provides radio coverage for one or more mobile radio cells (CE) within a mobile radio network subsystem 101, 102. Between a respective UMTS base station 108, 109, 110, 111 and a subscriber terminal 118 (user equipment, UE), subsequently also called mobile radio terminal, in a mobile radio cell, message signals or data signals are transmitted using an air interface, called Uu air interface 117 in UMTS, preferably using a multiple access transmission method.

By way of example, the UMTS-FDD (Frequency Division Duplex) mode is used to achieve separate signal transmission in the uplink and downlink directions (uplink: signal transmission from the mobile radio terminal 118 to the respective UMTS base station 108, 109, 110, 111; downlink: signal transmission from the respective associated UMTS base station 108, 109, 110, 111 to the mobile radio terminal 118) through appropriate separate assignment of frequencies or frequency ranges.

A plurality of subscribers, in other words a plurality of activated mobile radio terminals 118 registered in the mobile radio access network, in the same mobile radio cell preferably have their signaling separated from one another using orthogonal codes, particularly using the "CDMA method" (Code Division Multiple Access).

In this connection, it should be noted that FIG. 1 shows only one mobile radio terminal 118 for reasons of simple illustration. In general, however any number of mobile radio terminals 118 are provided in the mobile radio system 100.

The communication between a mobile radio terminal 118 and another communication terminal can be set up using a complete mobile radio communication link to another mobile radio terminal, alternatively to a landline communication terminal.

Figure 2:
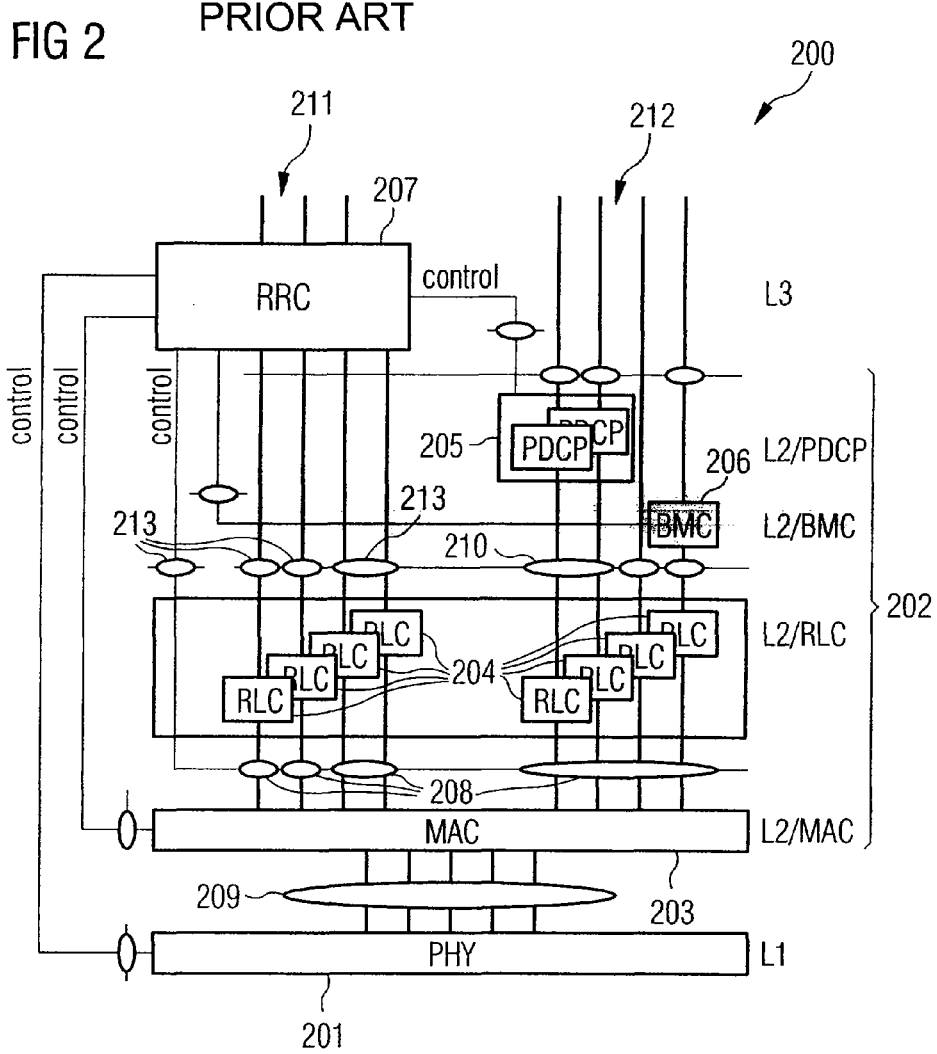
FIG. 2 shows an illustration of a protocol structure for the UMTS air interface.

As FIG. 2 shows, the UMTS air interface 117 is logically divided into three protocol layers (symbolized in FIG. 2 by a protocol layer arrangement 200). The units (entities) ensuring and providing the functionality of the respective protocol layers described below are implemented both in the mobile radio terminal 118 and in the UMTS base station 108, 109, 110, 111 or in the respective mobile radio network control unit 106, 107.

FIG. 2 shows the protocol structure 200 from the viewpoint of the dedicated transport channel DCH (Dedicated Channel).

The bottommost layer shown in FIG. 2 is the physical layer PHY 201, which represents the protocol layer 1 on the basis of the OSI reference model (Open System Interconnection) on the basis of the ISO (International Standardization Organization).

The protocol layer arranged above the physical layer 201 is the data link layer 202, protocol layer 2 on the basis of the OSI reference model, which for its part has a plurality of subprotocol layers, namely the Medium Access Control protocol layer(MAC protocol layer) 203, the Radio Link Control protocol layer 204 (RLC protocol layer), the Packet Data Convergence Protocol protocol layer 205 (PDCP protocol layer), and also the Broadcast/Multicast Control protocol layer 206 (BMC protocol layer).

The topmost layer of the UMTS air interface Uu is the mobile radio network layer (protocol layer 3 on the basis of the OSI reference model), having the mobile radio resource control unit 207 (Radio Resource Control protocol layer, RRC protocol layer).

Each protocol layer 201, 202, 203, 204, 205, 206, 207 provides the protocol layer above it with its services via prescribed, defined service access points.

To provide a better understanding of the protocol layer architecture, the service access points have been provided with generally customary and unambiguous names, such as logical channels 208 between the MAC protocol layer 203 and the RLC protocol layer 204, transport channels 209 between the physical layer 201 and the MAC protocol layer 203, radio bearers (RB) 210 between the RLC protocol layer 204 and the PDCP protocol layer 205 or the BMC protocol layer 206, and also signaling radio bearers (SRB) 213 between the RLC protocol layer 204 and the RRC protocol layer 207.

On the basis of UMTS, the protocol structure 200 shown in FIG. 2 is split not just horizontally into the above-described protocol layers and units of the respective protocol layers, but also vertically into a "control protocol plane" 211 (control plane, C plane), which contains parts of the physical layer 201, parts of the MAC protocol layer 203, parts of the RLC protocol layer 204 and also the RRC protocol layer 207, and the user protocol plane 212 (user plane, U plane), which contains parts of the physical layer 201, parts of the MAC protocol layer 203, parts of the RLC protocol layer 204, the PDCP protocol layer 205 and also the BMC protocol layer 206.

The units of the control protocol plane 211 are used to transmit exclusively control data, which are required for setting up and clearing down and also maintaining a communication link, whereas the units of the user plane 212 are used to transport the actual useful data.

Details regarding the protocol layer arrangement 200 are described in 3GPP TS 25.301, Technical Specification, Third Generation Partnership Project; Technical Specification Group Radio Access Network; Radio Interface Protocol Architecture (Release 1999).

Each protocol layer or each unit (entity) of a respective protocol layer has particular prescribed functions during mobile radio communication.

The transmitter end needs to ensure the task of the physical layer 201 or of the units of the physical layer 201, the secure transmission via the air interface 117 of data coming from the MAC protocol layer 203. In this connection, the data are mapped onto physical channels (not shown in FIG. 2). The physical layer 201 provides the MAC protocol layer 203 with its services via transport channels 209 and these are used to stipulate how and with what characteristics the data are to be transported via the air interface 117. The fundamental functions which are provided by the units of the physical layer 201 include channel coding, modulation and CDMA code spreading. Correspondingly, the physical layer 201 or the entities of the physical layer 201 at the receiver end performs the CDMA code despreading, the demodulation and the decoding of the received data and then forwards these data to the MAC protocol layer 203 for further processing.

The MAC protocol layer 203 or the units of the MAC protocol layer 203 provides or provide the RLC protocol layer 204 with its or their services using logical channels 208 as service access points and these are used to characterize what type of file the transported data involve. The task of the MAC protocol layer 203 in the transmitter, i.e. during data transmission in the uplink direction in the mobile radio terminal 118, is particularly to map the data which are present on a logical channel 208 above the MAC protocol layer 203 onto the transport channels 209 of the physical layer 201. The physical layer 201 provides the transport channels 209 with discrete transmission rates for this. It is therefore an important function of the MAC protocol layer 203 or of the entities of the MAC protocol layer 203 in the mobile radio terminal 118 in the transmission situation to select a suitable transport format (TF) for each configured transport channel on the basis of the respective current data transmission rate and the respective data priority of the logical channels 208 which are mapped onto the respective transport channel 209, and also the available transmission power of the mobile radio terminal 118 (UE). A transport format contains, inter alia, a stipulation of how many MAC data packet units, called transport block, are transmitted, in other words transferred, to the physical layer 201 via the transport channel 209 per transmission period TTI (Transmission Time Interval). The admissible transport formats and also the admissible combinations of the transport formats for the various transport channels 209 are signaled to the mobile radio terminal 118 by the mobile radio network control unit 106, 107 when a communication link is set up. In the receiver, the units of the MAC protocol layer 203 split the transport blocks received on the transport channels 209 over the logical channels 208 again.

The MAC protocol layer or the units of the MAC protocol layer 203 normally has or have three logical units. The "MAC-d unit" (MAC dedicated unit) handles the useful data and the control data, which are mapped onto the dedicated transport channels DCH (Dedicated Channel) via the corresponding dedicated logical channels DTCH (Dedicated Traffic Channel) and DCCH (Dedicated Control Channel). The MAC-c/sh unit (MAC control/shared unit) handles the useful data and the control data from logical channels 208, which are mapped onto the common transport channels 209, such as the common transport channel RACH (Random Access Channel) in the uplink direction or the common transport channel FACH (Forward Access Channel) in the downlink direction. The MAC-b unit (MAC broadcast unit) handles only the mobile radio cell-related system information, which is mapped via the logical channel BCCH (Broadcast Control Channel) onto the transport channel BCH (Broadcast Channel) and is transmitted by broadcast to all of the mobile radio terminals 118 in the respective mobile radio cell.

Using the RLC protocol layer 204 or using the units of the RLC protocol layer 204, the RRC protocol layer 207 is provided with its services by means of signaling radio bearers (SRB) 213 as service access points, and the PDCP protocol layer 205 and the BMC protocol layer 206 are provided with their services by means of radio bearers (RB) 210 as service access points. The signaling radio bearers and the radio bearers characterize the way in which the RLC protocol layer 204 needs to handle the data packets. To this end, by way of example, the RRC protocol layer 207 stipulates the transmission mode for each configured signaling radio bearer or radio bearer. The following transmission modes are provided in UMTS:

Transparent Mode TM,
Unacknowledged Mode (UM), or
Acknowledged Mode (AM).

The RLC protocol layer 204 is modeled such that there is an independent RLC entity for each radio bearer or signaling radio bearer. In addition, the task of the RLC protocol layer or of its entities 204 in the transmission device is to split or assemble the useful data and the signaling data from radio bearers or signaling radio bearers into data packets. The RLC protocol layer 204 transfers the data packets produced after the split or the assembly to the MAC protocol layer 203 for further transport or for further processing.

In addition, a transmission safeguarding method is applied on the RLC protocol layer plane in order to ensure that data transmission is as error-free as possible. However, this is provided only in the transmission mode Acknowledged Mode, i.e. for data transmission using acknowledgement of receipt. To this end, the RLC protocol data units are consecutively numbered from beginning to end in the transmitter and are buffer-stored in an RLC buffer store until the receiver signals appropriate acknowledgements about error-free receipt of the respective protocol data unit(s). If no acknowledgement about error-free receipt is received by the transmitter, the erroneous received data packets are transmitted again. The receiver identifies transmission errors from the gaps in the series of sequential numbers, said gaps being associated with the RLC protocol data units, as was described above. The receiver signals error-free or erroneous receipt of the data packets to the transmitter using "status protocol data units", i.e. control data units specific to the RLC. Two options are provided for transmitting the RLC status protocol data units, as described in 3GPP TS 25.322, Technical Specification, Third Generation Partnership Project; Technical Specification Group Radio Access Network; Radio Link Control (RLC) Protocol Specification, Release 6, December 2004. Firstly, a separate control data unit is provided and secondly, a "piggyback" with the useful data, i.e. packed in a useful data protocol data packet, i.e. in a useful data protocol data unit.

It should furthermore be noted in this context that the transmission of this RLC control information in line with 3GPP TS 25.322, Technical Specification, Third Generation Partnership Project; Technical Specification Group Radio Access Network; Radio Link Control (RLC) Protocol Specification, Release 6, December 2004 generally always has higher priority over the useful data packets.

The PDCP protocol layer 205 or the units of the PDCP protocol layer 205 is or are set up to transmit or to receive data from the "packet switched domain" (PS domain). The main function of the PDCP protocol layer 205 is to compress or decompress the IP header information (Internet Protocol header information).

The BMC protocol layer 206 or its entities is or are used to transmit or to receive "cell broadcast messages" via the air interface.

The RRC protocol layer 207 or the entities of the RRC protocol layer 207 is or are responsible for setting up and clearing down and reconfiguring physical channels, transport channels 209, logical channels 208, signaling radio bearers 213 and radio bearers 210 and also for negotiating all of the parameters of the protocol layer 1, i.e. of the physical layer 201 and of the protocol layer 2. To this end, the RRC units, i.e. the units of the RRC protocol layer 207, in the mobile radio network control unit 106, 107 and the respective mobile radio terminal 118 interchange appropriate RRC messages, via the signaling radio bearers 213. Details regarding the RRC layer are described in 3GPP TS 25.331, Technical Specification, Third Generation Partnership Project; Technical Specification Group Radio Access Network; RRC Protocol Specification (Release 1999).

As described above, the mobile radio terminal 118 can communicate information ("measurement report messages") about the volume of data traffic on a transport channel to its associated mobile radio network control unit 106, 107 one the RRC plane in order to manage the mobile radio resources. In this case, the serving mobile radio network control unit (Serving Radio Network Controller, SRNC) is provided with an indication of the RLC data buffer filling levels of the transport channel in question, i.e. it is indicated how many data items there are currently in the respective RLC data buffer stores of the mobile radio terminal 118.

Using this information, the serving mobile radio network control unit 106, 107 can then perform appropriate configuration operations on the mobile radio terminal 118, for example in order to restrict or increase the usable transport formats of a mobile radio terminal 118 or to effect handover to another mobile radio cell, reconfiguration of the dedicated physical channels or an RRC state change from a first state CELL_DCH to a second state CELL_FACH.

The standardization committee 3GPP is currently working on improving packet data transmission by dedicated transport channels in the uplink for the UMTS-FDD mode.

In this connection, a dedicated transport channel called Enhanced-DCH (E-DCH) is provided. The fundamental characteristics of this new transport channel include the application of a hybrid automatic repeat request method (HARQ method) on the basis of the N-channel Stop&Wait method, scheduling controlled by a UMTS base station and provision of frame lengths of less than or equal to 10 ms, preferably of 2 ms or 10 ms. The HARQ transmission protection method is used to transmit an acknowledgement about correctly or incorrectly received data to the mobile radio terminal 118 from the network. For this function, the mobile radio terminal 118 contains various data buffer stores in order to buffer-store the data prior to acknowledgement of correct receipt.

To perform the functions relating to E-DCH, a new subprotocol layer of the MAC protocol layer 203 has been implemented within the UMTS protocol architecture, and is called the MAC-e/es subprotocol layer, introduced within the MAC subprotocol layer, with the MAC-e/es subprotocol layer being implemented both on the terminal, i.e. in the mobile radio terminal 118, and on the network, i.e. in a UMTS base station 108, 109, 110, 111, or in the RNC. The MAC-e/es subprotocol layer 301 receives its data from an MAC-d subprotocol layer 302 (see block diagram 300 in FIG. 3) via "MAC-d flows" 303, 304 and transmits its useful data, again using the E-DCH transport channel 305, to the physical layer 201.

The MAC-d subprotocol layer 302 receives its data from the logical channels DCCH 306 and/or DTCH 307 and multiplexes these data onto the MAC-d flows 303, 304 using multiplexers 308.

At the terminal end, there is no functional separation of this new MAC-e/es subprotocol layer 301. FIG. 3 uses the block diagram 300 to show the implementation of the MAC-e/es architecture at the terminal end. Details in this regard are described in 3GPP TS 25.309 Technical Specification, Third Generation Partnership Project; Technical Specification Group Radio Access Network; FDD Enhanced Uplink; Overall description, stage 2, Release 6, December 2004.

The MAC-e/es subprotocol layer 301 or its entities communicate(s) with the RRC protocol layer 207 via an MAC control access point, for example for the purpose of configuration.

In the MAC-d subprotocol layer 302, one or more logical channels 306, 307 are multiplexed onto an MAC-d flow 303, 304, with each logical channel 306, 307 being allocated a priority.

In the multiplexing and TSN setting unit 309, the MAC-d protocol data units of the MAC-d flows 303, 304 are multiplexed first of all into "MAC-es protocol data units" and then into MAC-e protocol data units on the basis of the transport format selected by the E-TFC selection unit (E Transport Format Combination selection unit) 310 and on the basis of the MAC-d flow combination. The RLC protocol data units 401 (see diagram 400 in FIG. 4) are multiplexed in an MAC-es protocol data unit 402 to form respective MAC-d protocol data units 403 of a logical channel, so that the MAC-d protocol data units 403 all have the same size. In addition, each MAC-es protocol data unit 402 is consecutively numbered from beginning to end, i.e. an MAC-es protocol data unit 402 has a transmission sequence number 404 (TSN) appended to it, so that sequential receipt of the MAC-es protocol data units 402 is made possible per logical channel at the receiver end. The TSN 404 forms the MAC-es header field 405 and the MAC-d protocol data units 403 together form the MAC-es useful data 406 (MAC-es payload). The individual MAC-es protocol data units 402 are then multiplexed to form an MAC-e protocol data unit 501 (cf. diagram 500 in FIG. 5).

The MAC-e protocol data unit 501 is then forwarded to the HARQ unit 311.

FIG. 4 shows the structure of an MAC-es protocol data unit 402 and FIG. 5 shows the structure of an MAC-e protocol data unit 501.

In an MAC-e header field (MAC-e header) 502, the parameters DDI (Data Description Indicator) 503 and N 504 are added to each multiplexed MAC-es protocol data unit 402. The parameter DDI 503 identifies the logical channel, the MAC-d flow 303, 304 and the MAC-d protocol data unit size. The parameter N 504 indicates how many MAC-d protocol data units 403 are multiplexed in the respective MAC-es protocol data unit 402. The MAC-es protocol data units 402 together form the MAC-e useful data 505 (MAC-e payload) in the MAC-e protocol data unit 501.

In line with the N-channel Stop&Wait HARQ method, the HARQ unit 311 comprises a number of N "HARQ processes", with an HARQ process representing a respective instance of the Stop&Wait method. For each HARQ process, the HARQ unit 311 forwards an MAC-e protocol data unit 501 via the E-DCH transport channel 305 to the physical layer 201, where they are then transmitted to the network via dedicated physical channels using the air interface 117.

The HARQ unit 311 buffer-stores the packet data unit transmitted for each HARQ process in an appropriate HARQ buffer store (not shown) until successful transmission has been acknowledged by the network.

An E-TFC selection unit 310 coupled to the HARQ unit 311 is responsible for selecting the transport format suitable for transmission for each HARQ process.

In the MAC-e/es subprotocol layer 301, this is done by using the RRC protocol layer 207 to configure a set of different transport formats from which the E-TFC selection unit 310 selects a suitable one for each transmission time interval (TTI) and for each HARQ process.

The MAC-e/es subprotocol layer 300 is set by the mobile radio network control unit 106, 107 using the RRC protocol layer 207.

When the communication link is set up (connection setup), the subscriber and hence the subscriber mobile radio terminal 118 are allocated the appropriate mobile radio resources required for the communication link, such as the necessary CDMA spreading codes, on the network, i.e. on the UTRAN, by the mobile radio network control unit 106, 107, and the protocols of the protocol layers 1 and 2 are configured such that the communication service can be secured with a negotiated quality of service for the duration of the communication link.

The negotiated quality of service of a communication service can be reconfigured during an existing communication link by the mobile radio core network 105, for example on account of scarce mobile radio resources or increasing interference in the mobile radio cell.

"NodeB-controlled scheduling" is a method in which the scheduling in the mobile radio terminal 118, i.e. the selection of an appropriate transport format from a set of defined transport formats for the E-DCH transport channel, is controlled such that NodeB 108, 109, 110, 111 can temporarily restrict the use by the mobile radio terminal 118 of transport formats from the set of defined transport formats for the E-DCH transport channel on the basis of the traffic situation in the respective mobile radio cell.

On the network, the NodeB-controlled scheduling is provided, i.e. implemented, in the MAC-e subprotocol layer. The MAC-e subprotocol layer is situated at NodeB 108, 109, 110, 111 on the network.

So that NodeB 108, 109, 110, 111 can perform efficient scheduling for the subscriber terminal 118 in a mobile radio cell, provision is made for the subscriber terminal 118 to signal appropriate control information to NodeB 108, 109, 110, 111, e.g. its current data buffer filling levels, particularly the data buffer filling levels of the transmission buffer stores of the data link layer, and transmission power situation on the MAC-e/es protocol layer plane.

There are two options for transmitting the control information: firstly as a separate control protocol data unit ("MAC-e control PDU") and secondly together with the useful data, i.e. packed in an MAC-d protocol data unit, also referred to as "piggybacked".

It should be noted that, in line with the conventional devices, consideration is given only to the case in which the transmission of the control information generally always has higher priority over the transmission of the useful data.

It has been established, in line with the invention, that this is not efficient, however, particularly in respect of the use of the transmission capacity on the E-DCH transport channel, for the following reasons:

the scope of the control information to be transmitted is variable, depending on the respective grounds for transmitting the control information, it is not possible to indicate the urgency or importance thereof, and depending on the respective urgency or importance of the control information which is to be transmitted, rapid transmission is not assured in respect of the HARQ.

For the inventive exemplary embodiments below for transmitting control information on the MAC-e/es subprotocol layer plane, the following scenario is considered, without restricting general validity:

In similar fashion to the priorities which are allocated to useful data, with the data from the logical channels being supplied as useful data to the MAC-e/es subprotocol layer unit, the network can define explicit priorities for control information, starting from a first priority value "1" to an eighth priority value "8", generally an arbitrary number of priority values, with a priority value of "1" representing the highest priority and a priority value of "8" representing the lowest priority of the respective control information.

Depending on the type of control information to be transmitted and the trigger mechanism for transmitting this information, the network has configured the following priorities for a subscriber terminal 118 on the basis of the preferred exemplary embodiments of the invention:

Priority value "1":
Trigger mechanism:
Quantity of available E-TFCs is below a prescribable threshold n, transmission power for the E-DCH is below a prescribable threshold x, the sum of the RLC buffer stores of n logical channels with the highest priority is above a prescribable threshold y;
Type of control information to be transmitted:
Maximum available E-TFC, sum of the RLC buffer stores of n logical channels with the highest priority in bytes.

Priority value "2":
Trigger mechanism:
Available transmission power for the E-DCH is below the quantity of available E-TFCs, the sum of the RLC buffer stores of n logical channels with the highest priority exceeds the quantity of available E-TFCs;
Type of control information to be transmitted:
Available transmission power for E-DCH, maximum available E-TFC, sum of the RLC buffer stores of n logical channels with the highest priority in bytes.

Priority value "3":
Trigger mechanism:
Polling: i.e. signaling requested by the network;
Type of control information to be transmitted:
Available transmission power for E-DCH, maximum available E-TFC, sum of the RLC buffer stores of n logical channels with the highest priority in bytes.

Priority value "4":
Trigger mechanism:
Periodic signaling;
Type of control information to be transmitted:
Available transmission power for E-DCH, maximum available E-TFC, sum of the RLC buffer stores of n logical channels with the highest priority in bytes.

In this connection, it should be pointed out that both the number of priority values provided and the number of associated priority classes are arbitrary in principle and also the classification, i.e. the association of the respective trigger mechanisms or trigger events which results in an appropriate control information item being produced and the type of control information which is then to be transmitted are arbitrary and are dependent on the respective application or the respective characteristics of the mobile radio network.

In addition, for the illustrated exemplary embodiments, a transmission scenario is considered in which a user of the mobile radio terminal 118 uses two packet services in the uplink at parallel times. These packet data are transmitted from the mobile radio terminal 118 via the E-DCH transport channel 305 to the mobile radio communication network. On the basis of this transmission scenario, the mobile radio communication network has three logical channels configured: DCCH with priority "2" for transmitting RRC signaling information, DTCH1 with priority "2" for transmitting data from the first packet service, and DTCH2 with priority "3" for transmitting data from the second packet service. In addition, two MAC-d flows are configured: MAC-d flow 1, onto which DCCH and DTCH1 are multiplexed, and MAC-d flow 2, onto which only DTCH2 is multiplexed.

Figure 6:
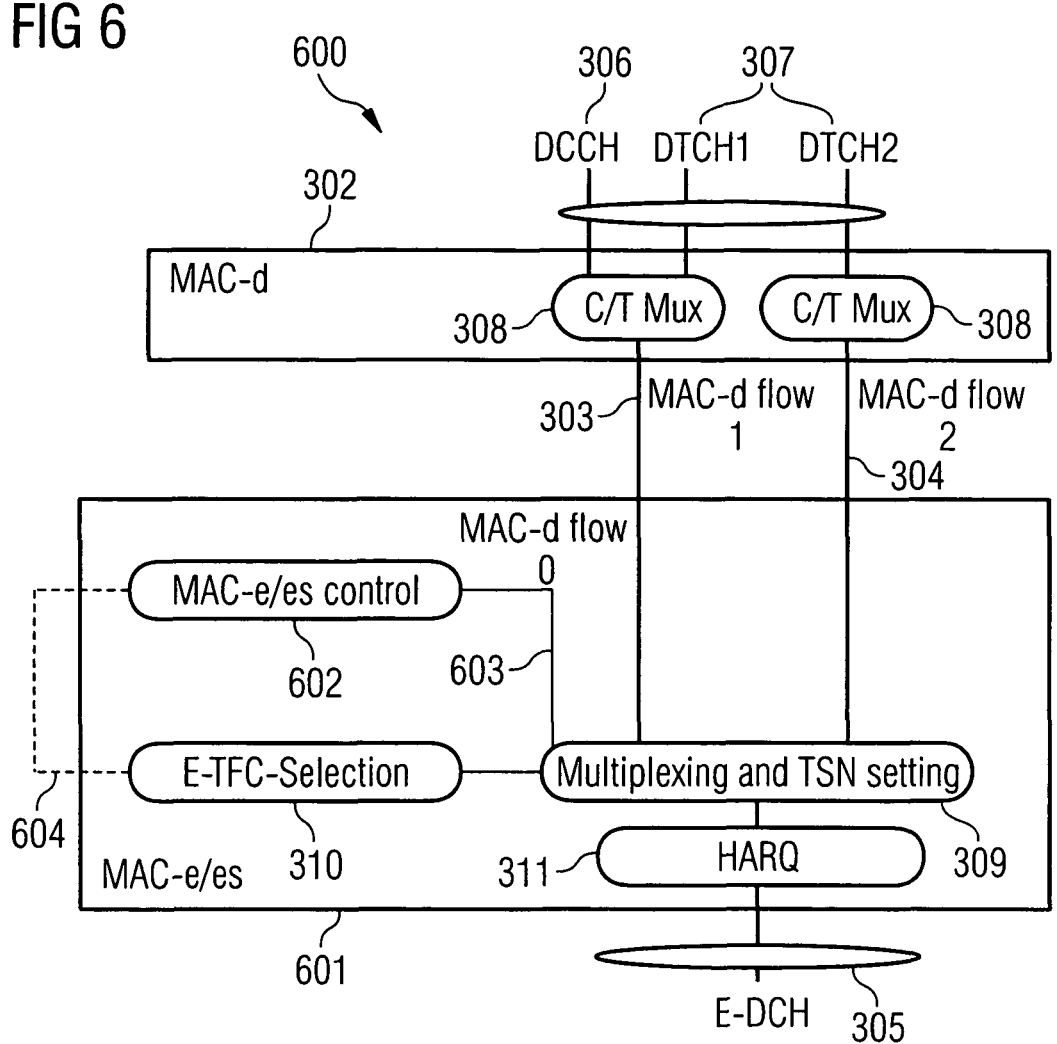
FIG. 6 shows an illustration of the units in an MAC-e/es subprotocol layer on the part of a mobile radio terminal based on an exemplary embodiment of the invention.

FIG. 6 shows a block diagram 600 of an exemplary embodiment of the MAC-e/es subprotocol layer 601 at the terminal end, in which the control information is transmitted as a separate control protocol data unit. The same or similar units compared with the units in FIG. 3 have been provided with identical reference symbols.

The MAC-e/es subprotocol layer 601 based on this exemplary embodiment of the invention contains an MAC-e/es control unit 602 (called MAC-e/es control) which controls the transmission of the control information. The control information to be transmitted from the MAC-e/es subprotocol layer 601 is buffer-stored in a transmission buffer in the MAC-e/es control unit 602.

In this exemplary embodiment of the invention, it is assumed that the control information is transmitted just as a separate (control) protocol data unit 702 (cf. diagram 700 in FIG. 7) in an MAC-e protocol data unit 701. To this end, a separate MAC-d flow 0 603 is configured for the MAC-e/es control unit 602, said MAC-d flow 0 terminating in the MAC-e/es subprotocol layer 601, in contrast to the two other MAC-d flows 303, 304. In other words, this means that no logical channel is multiplexed onto the MAC-d flow 0 603. In addition, the MAC-e/es control unit 602 has a control interface 604 with the E-TFC selection unit 310.

It is subsequently assumed, without restricting the general validity, that during an existing E-DCH mobile radio link the result of the E-TFC selection is that the maximum available E-TFC is not sufficient to process the sum of the RLC protocol data units in the buffer stores of the n logical channels with the highest priority. The E-TFC selection unit 310 signals this to the MAC-e/es control unit 602 via the control interface 604, with the MAC-e/es control unit 602 then producing a control information item or an MAC-e control protocol data unit with the highest priority, i.e. with the priority value "1" associated therewith, and buffer-storing it in the transmission buffer of the MAC-e/es control unit 602.

In the next transmission time interval TTI in time, the E-TFC selection unit 310 is active again and chooses a suitable E-TFC, i.e. a suitable transport format combination, on the basis of the currently available quantity of E-TFCs, the priority of the data to be transmitted, the permitted MAC-d flow combinations and the available transmission power for the E-DCH transport channel 305. Since the MAC-e control protocol data unit 702 has the highest priority, that E-TFC which ensures transmission of the MAC-e control protocol data unit 702 is selected.

The situation is considered in which the E-TFC selection unit 310 selects an E-TFC in which not only the MAC-e control protocol data unit 702 but also protocol data units from the logical channels DTCH1 and DTCH2 can be transmitted.

The E-TFC selection unit 310 signals the selected E-TFC, i.e. the selected transport format combination, and the MAC-d flow combination to the multiplexing and TSN setting unit 309. This unit multiplexes the data packets, on the basis of the signaled values, first into MAC-es protocol data units 702, 703, i.e. an MAC-es protocol data unit 702 is produced which comprises exclusively the MAC-e control protocol data unit 702, i.e. contains only this unit. All the MAC-es protocol data units 702, 703 produced are then multiplexed, i.e. equally, into an MAC-e protocol data unit 701. This is then forwarded to the HARQ unit 311.

FIG. 7 shows the resultant MAC-e protocol data unit 701 into which the MAC-e control protocol data unit 702 is multiplexed as MAC-es $PDU_0$, as described above.

FIG. 8 shows a further exemplary embodiment of the MAC-e/es architecture at the terminal end, on the basis of which a control information item transmitted "piggybacked" is provided.

As diagram 800 shows, it is assumed in line with this exemplary embodiment of the invention that the control information is transmitted "piggybacked" with the useful data, i.e. packed in an MAC-es protocol data unit. In this case, the MAC-e/es control unit 602 has an additional first interface 801 to the RLC protocol layer 204, an additional second interface 802 with the multiplexing and TSN setting unit 309 and also, as in line with an exemplary embodiment too, an interface 604 with the E-TFC selection unit 310.

As in line with the exemplary embodiment, a situation is assumed that during an existing E-DCH mobile radio link the result of the E-TFC selection is that the maximum available E-TFC is not sufficient to process the sum of the RLC protocol data units in the buffer stores of the n logical channels with the highest priority.

The E-TFC selection unit 310 signals this to the MAC-e/es control unit 602 via the control interface 604, with the MAC-e/es control unit 602 then producing a control information item or an MAC-e control protocol data unit with the highest priority, i.e. with the priority value "1", and buffer-storing it in the transmission buffer of the MAC-e/es control unit 602.

In the next transmission time interval TTI, the E-TFC selection unit 310 is active again and selects a suitable E-TFC on the basis of the currently available quantity of the E-TFCs, the priority of the data to be transmitted, the permitted MAC-d flow combinations and the available transmission power for the E-DCH transport channel 305.

In this case, however, the E-TFC selection unit 310 selects a suitable E-TFC independently of the MAC-e control protocol data unit in the transmission buffer in the MAC-e/es control unit 602. The situation is considered in the which E-TFC selection unit 310 selects an E-TFC in which only protocol data units from the logical channel DTCH1 are transmitted.

The E-TFC selection unit 310 signals the selected E-TFC and the MAC-d flow combination to the multiplexing and TSN setting unit 309. This unit uses the control interface with the MAC-e/es control unit 602 to check whether there are MAC-e control protocol data units in the transmission buffer.

Since this is the case in accordance with this exemplary embodiment, it takes the MAC-e control protocol data unit from the transmission buffer and temporarily buffer-stores it in itself in order to multiplex it on the basis of its priority into the MAC-es protocol data unit with the corresponding priority. The MAC-e/es control unit 602 in turn signals to the RLC layer 204, using the control interface 801, that the RLC protocol layer unit 204 needs to provide an appropriate amount of space in the RLC protocol data unit to be generated for the logical channel DTCH1, into which unit the MAC-e control protocol data unit is to be transmitted "piggybacked", i.e. is to be multiplexed, i.e. that it must not put RLC useful data into a corresponding area in the protocol data unit produced by the RLC protocol layer unit 204.

Figure 9:
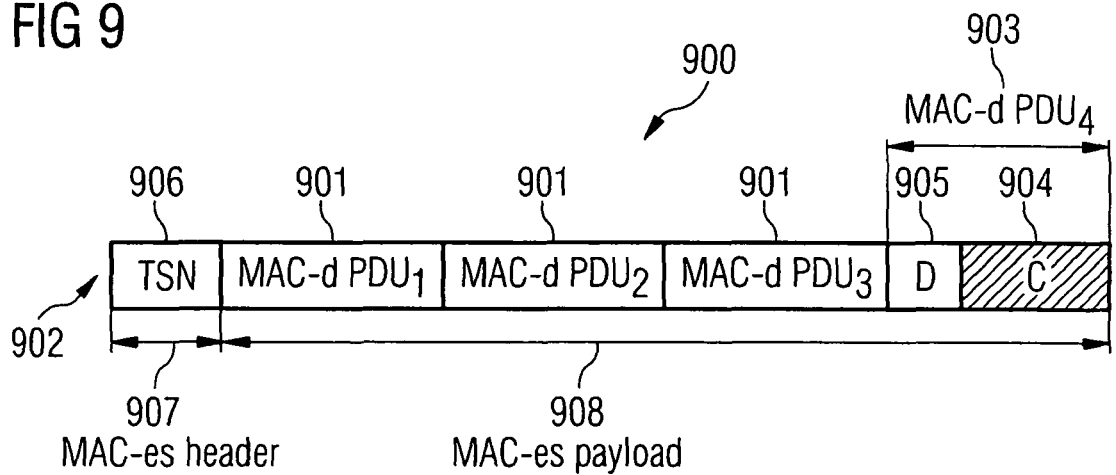
FIG. 9 shows an illustration of an MAC-e/es protocol data unit structure based on the exemplary embodiment of the invention shown in FIG. 8.

On the basis of the E-TFC selected by the E-TFC selection unit 310 and the MAC-d flow combination, the multiplexing and TSN setting unit 309 multiplexes the MAC-d protocol data units 901 (see diagram 900 in FIG. 9) into the MAC-es protocol data unit 902 and then into an MAC-e protocol data unit. This is then forwarded to the HARQ unit 311. The diagram in FIG. 9 shows the resultant MAC-es protocol data unit 902 in which the MAC-e control protocol data unit 904 has been "piggybacked" in the fourth MAC-d protocol data unit 903. In other words, the MAC-e control protocol data unit 904 has been packed into the MAC-d $PDU_4$ 903, which, besides the useful data, i.e. in addition to the useful data 905 from the MAC-d subprotocol layer 302, has the MAC-e control protocol data unit 904.

The TSN 906 forms the MAC-es header field 907 (MAC-es header) and the MAC-d protocol data units 901, 903 (MAC-d-$PDU_1$, MAC-d-$PDU_2$, MAC-d-$PDU_3$, MAC-d-$PDU_4$) together form the MAC-es useful data 908 (MAC-es payload).

In line with another exemplary embodiment of the invention, provision is made for the control information to be stored and processed in the transmission buffer of the MAC-e/es control unit 602.

Figure 10:
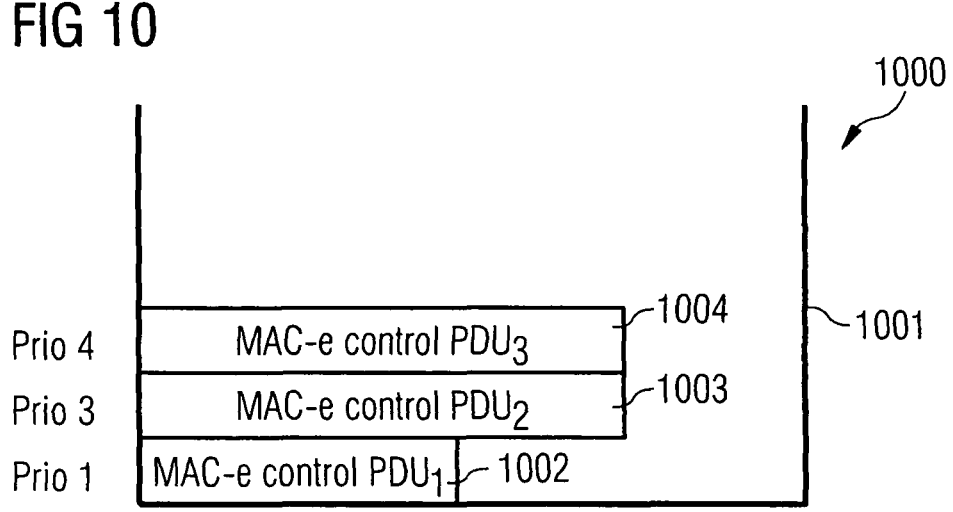
FIG. 10 shows an illustration of a transmission buffer store based on another exemplary embodiment of the invention.

In line with this exemplary embodiment of the invention, it is assumed that the transmission buffer 1001 in the MAC-e/es control unit 602 shown in FIG. 10 (see block diagram 1000) contains three MAC-e control protocol data units with different priorities, namely
  a first MAC-e control protocol data unit 1002 with the highest priority with its associated priority value "1" (MAC-e control $PDU_1$), a second MAC-e control protocol data unit 1003 with a third highest priority, i.e. with its associated third priority value "3" (MAC-e control PDU$_2$), and a third MAC-e control protocol data unit 1004 with the lowest-priority messages stored in protocol data units stored in the transmission buffer, i.e. with its associated priority value "4" (MAC-e control PDU$_3$).

In line with this exemplary embodiment of the invention, the MAC-e control protocol data units 1002, 1003, 1004 are buffer-stored and processed on the basis of their priority, i.e. on the basis of their priority values, in the transmission buffer store 1001, i.e. firstly the highest-priority first MAC-e control protocol data unit 1002 is read, then the second MAC-e control protocol data unit 1003 and finally the lowest-priority third MAC-e control protocol data unit 1004.

If, by way of example, a new MAC-e control protocol data unit (MAC control PDU$_4$) with the priority "2", i.e. with a lower priority than the first MAC-e control protocol data unit 1002, but with a higher priority than the second MAC-e control protocol data unit 1003 and the MAC-e control protocol data unit 1004, is generated then this is added to the transmission buffer store 1001 between the first MAC-e control protocol data unit 1002 and the second MAC-e control protocol data 1003 and is accordingly read in second place.

If a new MAC-e control PDU$_4$ with the highest priority, i.e. with the priority value "1", is generated, for example, the already existing MAC-e control protocol data unit 1002 is overwritten by this new MAC-e control protocol data unit, i.e. in other words MAC-e control protocol data units are always replaced by respective current MAC-e control protocol data units with the same priority.

An MAC-e control protocol data unit is erased in the transmission buffer store 1001 when the HARQ unit 311 signals successful transmission or if a maximum residence time for the respective MAC-e control protocol data unit in the transmission buffer 1001 is exceeded.

In the case of HARQ retransmissions, the higher-priority MAC-e control protocol data units are sent repeatedly in successive HARQ processes until the HARQ unit signals successful transmission or if a maximum residence time has not yet been exceeded.

The priorities for which this is permitted are signaled by the network. In this exemplary embodiment, it is assumed that this is permitted by the network only for MAC-e control protocol data units with the priority "1", i.e. with the highest priority.

In summary, one aspect of the invention may be seen in that an advantageous method for efficiently transmitting control information particularly on the plane of the MAC-e protocol layer, generally on the plane of the data link protocol layer, has been provided on the basis of the priority of the control information to be transmitted and the available transmission capacity on the E-DCH transport channel.

Figure 11:
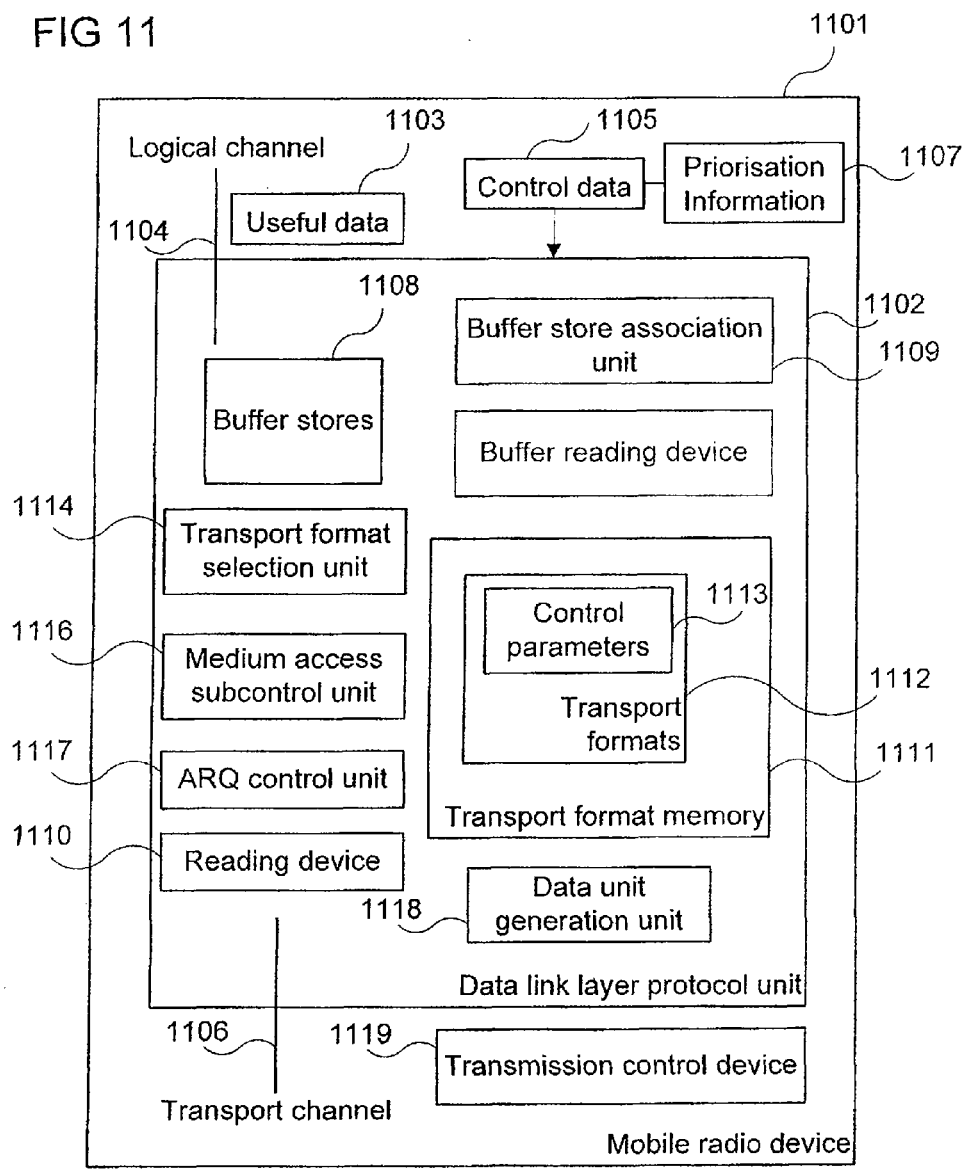
FIG. 11 shows a mobile radio device 1101 according to an embodiment.

FIG. 11 shows a mobile radio device 1101 according to an embodiment.

The mobile radio device 1101 comprises a data link layer protocol unit 1102 that maps useful data 1103 which are to be transmitted using the mobile radio device 1101 from at least one logical channel 1104, and control data 1105 which are to be transmitted, onto at least one transport channel 1106, wherein the data link layer protocol unit 1102 maps the control data 1105 onto the at least one transport channel 1106 based on at least one prioritization information item 1107 associated with the control data 1105 which are to be transmitted from a plurality of prioritization information items.

The data link layer protocol unit 1102 may further comprise a plurality of data link layer protocol buffer stores 1108 that buffer-store the useful data 1103 which are to be transmitted from one or more data link layer data streams for the useful data of the logical channel 1104, and the control data 1105 which are to be transmitted; a data link layer protocol buffer store association unit 1109 that associates the control data 1105 which are to be transmitted with the data link layer protocol buffer store 1108 associated with the respective prioritization information item 1107 based on the prioritization information items; and a data link protocol buffer store reading device 1110 that reads the data buffer-stored in the data link layer protocol buffer stores 1108 based on a prescribable criterion taking into account the prioritization of the data link layer protocol buffer stores 1108.

The data link layer protocol unit 1102 may further comprise at least one transport format memory 1111 that stores a plurality of transport formats 1112, where each transport format 1112 contains control parameters 1113 based on which the data 1103 are mapped from the at least one logical channel 1104 onto the at least one transport channel 1106 by the data link layer protocol unit 1102, with the control parameters 1113 in at least some of the transport formats 1112 containing information regarding that or those data link layer protocol buffer stores 1108 and/or that or those data link layer data streams from which the data to be transmitted 1103 are to be transmitted in a data transmission time interval; at least one transport format selection unit 1114 that selects a respective transport format which is to be used from the plurality of stored transport formats 1112; and a data link layer protocol buffer store reading device 1110 that reads the data buffer-stored in the data link layer protocol buffer stores 1108 based on the selected transport format 1112.

The data link layer protocol unit 1102 is for example in a form of a unit selected from the group consisting of a radio link control unit 1102, a packet data convergence protocol unit 1102, and a broadcast/multicast control unit 1102.

The data link layer protocol unit 1102 may further comprise a medium access subcontrol unit 1116 and an automatic repeat request (ARQ) control unit 1117.

The data link layer protocol buffer stores 1108 are for example automatic repeat request buffer stores 1108, each being associated with an automatic repeat request process, and the data link layer protocol unit 1102 is for example set up such that the transport format(s) 1112 is/are selected based on filling levels in the automatic repeat request buffer stores 1108.

The data link layer protocol unit 1102 may further comprise a first medium access subprotocol data unit generation unit 1118 that generates first medium access subprotocol data units and a second medium access subprotocol data unit generation unit that generates second medium access subprotocol data units, wherein the second medium access subprotocol data unit generation unit 1118 forms the second medium access subprotocol data units using the first medium access subprotocol data units.

The mobile radio device 1101 may comprise a transmission control device 1119 that controls mobile radio transmission resources of the mobile radio device 1101, which transmission control device 1119 receives transport formats from another mobile radio device, allowing the transport formats to be prescribed by the other mobile radio device.

Specifically, the following aspects of the invention are particularly advantageous:

Definition of explicit priorities for control information on the basis of the type of control information to be transmitted and the trigger mechanism for transmitting this control information.

A transmission buffer in the MAC-e/es subprotocol layer buffer-stores and processes the control information on the basis of its priority.

If a maximum residence time for the control information in the transmission buffer stores is exceeded in this context, this information is erased.

If the control information is to be transmitted only as a separate control data unit, it is transmitted only if it has at least a higher priority than the useful data units.

If the control information is to be transmitted only in "piggybacked" form, it is packed at least into the useful data units with the respective corresponding priority.

If the control information can be transmitted either as separate control protocol data units or in "piggybacked" form, and the control information is made up of information with various priorities, then this information is split on the basis of its priorities and its available transmission capacities over the E-DCH transport channel and is accordingly transmitted separately and/or in "piggybacked" form.

If the control information is to be transmitted in "piggybacked" form, the MAC-e/es subprotocol layer signals to the RLC subprotocol layer in the subscriber terminal that it needs to provide appropriate "space" in the useful data protocol data units which are to be generated.

In the case of HARQ retransmissions, the higher-priority control information is sent again in subsequent HARQ processes, in contrast to the low-priority control information.

The invention claimed is:

1. A data link layer protocol unit, in a mobile radio device, configured to map useful data and a plurality of Radio Link Layer (RLC) buffer store filling levels, based on a plurality of respective prioritization information items, from at least one logical channel onto at least one transport channel,
wherein the useful data and the plurality of RLC buffer store filling levels are to be transmitted from the mobile radio device to at least one base station of a cellular radio network via the at least one transport channel,
the data link layer protocol unit further comprising:
a plurality of data link layer protocol buffer stores configured to buffer-store the useful data which are to be transmitted from one or more data link layer data streams for the useful data of the logical channel, and the plurality of RLC buffer store filling levels of the at least one logical channel;
a data link layer protocol buffer store association unit configured to associate the plurality of RLC buffer store filling levels of the at least one logical channel with the data link layer protocol buffer store associated with the respective prioritization information item based on the plurality of prioritization information items; and
a data link protocol buffer store reading device configured to read the data buffer-stored in the data link layer protocol buffer stores based on a prescribable criterion taking into account the prioritization of the data link layer protocol buffer stores.

2. The data link layer protocol unit as claimed in claim 1, set up as a medium access control unit, wherein at least some of the data link layer protocol buffer stores are medium access control unit protocol buffer stores, and the data link layer data streams are medium access control unit data streams.

3. The data link layer protocol unit as claimed in claim 2, further comprising a medium access subcontrol unit and an automatic repeat request control unit.

4. The data link layer protocol unit as claimed in claim 3, wherein the automatic repeat request control unit is configured to carry out a hybrid automatic repeat request method.

5. The data link layer protocol unit as claimed in claim 4, wherein the automatic repeat request control unit is configured to carry out precisely one automatic repeat request process per data link layer protocol buffer store.

6. The data link layer protocol unit as claimed in claim 5, wherein the data link layer protocol buffer stores are automatic repeat request buffer stores, each being associated with an automatic repeat request process, and
wherein the data link layer protocol unit is set up such that the transport format(s) is/are selected based on filling levels in the automatic repeat request buffer stores.

7. The data link layer protocol unit as claimed in claim 4, wherein the data link layer protocol unit is configured to select a transport format for each automatic repeat request process.

8. The data link layer protocol unit as claimed in claim 2, further comprising a first medium access subprotocol data unit generation unit configured to generate first medium access subprotocol data units, and a second medium access subprotocol data unit generation unit configured to generate second medium access subprotocol data units,
wherein the second medium access subprotocol data unit generation unit is configured to form the second medium access subprotocol data units using the first medium access subprotocol data units.

9. The data link layer protocol unit as claimed in claim 8, wherein the first medium access subprotocol data unit generation unit is configured to form control medium access subprotocol data units containing the plurality of RLC buffer store filling levels of the at least one logical channel or useful data medium access subprotocol data units containing the useful data which are to be transmitted.

10. The data link layer protocol unit as claimed in claim 2, wherein the first medium access subprotocol data unit generation is configured to form useful data medium access subprotocol data units containing the useful data which are to be transmitted, with control medium access subprotocol data units which contain the plurality of RLC buffer store filling levels of the at least one logical channel being added to the useful data which are to be transmitted in the useful data medium access subprotocol data units.

11. The data link layer protocol unit as claimed in claim 2, further comprising a medium access subprotocol data control data buffer store configured to buffer-store the plurality of RLC buffer store filling levels of the at least one logical channel.

12. The data link layer protocol unit as claimed in claim 11, further comprising a medium access subprotocol data control data buffer store configured to read the plurality of RLC buffer store filling levels of the at least one logical channel from the medium access subprotocol data control data buffer store based on the plurality of prioritization information items.

13. A data link layer protocol unit, in a mobile radio device,
configured to map useful data and a plurality of Radio Link Control (RLC) buffer store filling levels, based on a plurality of respective prioritization information items, from at least one logical channel onto at least one transport channel,
wherein useful data and the plurality of RLC buffer store filling levels are to be transmitted from the mobile radio device to at least one base station of a cellular radio network via the at least one transport channel, the data link layer protocol unit further comprising:
- at least one transport format memory configured to store a plurality of transport formats, where each transport format contains control parameters based on which the data are mapped from the at least one logical channel onto the at least one transport channel by the data link layer protocol unit, with the control parameters in at least some of the transport formats containing information regarding that or those data link layer protocol buffer stores and/or that or those data link layer data streams from which the data to be transmitted are to be transmitted in a data transmission time interval;
- at least one transport format selection unit configured to select a respective transport format which is to be used from the plurality of stored transport formats; and
- a data link layer protocol buffer store reading device configured to read the data buffer-stored in the data link layer protocol buffer stores based on the selected transport format.

14. A mobile radio device comprising:
a data link layer protocol means for mapping useful data and a plurality of Radio Link Control (RLC) buffer store filling levels, based on a plurality of respective prioritization information items, from at least one logical channel onto at least one transport channel, wherein the useful data and the plurality of RLC buffer store filling levels are to be transmitted from the mobile radio device to at least one base station of a cellular radio network via the at least one transport channel;
a plurality of data link layer protocol buffer means for buffer-storing the useful data which are to be transmitted from one or more data link layer data streams for the useful data of the logical channel, and the plurality of RLC buffer store filling levels of the at least one logical channel;
a data link layer protocol buffer store association means for associating the plurality of RLC buffer store filling levels of the at least one logical channel with the data link layer protocol buffer means associated with the respective prioritization information item based on the plurality of prioritization information items; and
a data link protocol buffer store reading means for reading the data buffer-stored in the data link layer protocol buffer means based on a prescribable criterion taking into account the prioritization of the data link layer protocol buffer means.

15. A mobile radio device comprising:
a data link layer protocol means for mapping useful data and a plurality of Radio Link Control (RLC) buffer store filling levels, based on a plurality of respective prioritization information items, from at least one logical channel onto at least one transport channel, wherein the useful data and the plurality of RLC buffer store filling levels are to be transmitted from the mobile radio device to at least one base station of a cellular radio network via the at least one transport channel;
at least one transport format memory means for storing a plurality of transport formats, where each transport format contains control parameters based on which the data are mapped from the at least one logical channel onto the at least one transport channel by the data link layer protocol means, with the control parameters in at least some of the transport formats containing information regarding that or those data link layer protocol buffer stores and/or that or those data link layer data streams from which the data to be transmitted are to be transmitted in a data transmission time interval;
at least one transport format selection means for selecting a respective transport format which is to be used from the plurality of stored transport formats; and
a data link layer protocol buffer store reading means for reading the data buffer-stored in the data link layer protocol buffer stores based on the selected transport format.

\* \* \* \* \*